US011926023B2

(12) United States Patent
Asplund et al.

(10) Patent No.: US 11,926,023 B2
(45) Date of Patent: Mar. 12, 2024

(54) HAND HELD ELECTRIC PULSE TOOL AND A METHOD FOR TIGHTENING OPERATIONS

(71) Applicant: ATLAS COPCO INDUSTRIAL TECHNIQUE AB, Stockholm (SE)

(72) Inventors: Daniel Per Erik Asplund, Huddinge (SE); John Robert Christian Friberg, Nacka (SE)

(73) Assignee: ATLAS COPCO INDUSTRIAL TECHNIQUE AB, Stockholm (SE)

( * ) Notice: Subject to any disclaimer, the term of this patent is extended or adjusted under 35 U.S.C. 154(b) by 103 days.

(21) Appl. No.: 17/044,804

(22) PCT Filed: Apr. 2, 2019

(86) PCT No.: PCT/EP2019/058271
§ 371 (c)(1),
(2) Date: Oct. 1, 2020

(87) PCT Pub. No.: WO2019/201587
PCT Pub. Date: Oct. 24, 2019

(65) Prior Publication Data

US 2021/0107122 A1 Apr. 15, 2021

(30) Foreign Application Priority Data

Apr. 18, 2018 (SE) ...................................... 1830129

(51) Int. Cl.
*B25B 23/147* (2006.01)
*B25B 21/02* (2006.01)

(52) U.S. Cl.
CPC .......... *B25B 23/1475* (2013.01); *B25B 21/02* (2013.01)

(58) Field of Classification Search
CPC ... B23P 19/065; B25B 23/1475; B25B 23/14; B25B 21/02; Y10T 29/49947; G05B 19/0405; G05B 19/182
(Continued)

(56) References Cited

U.S. PATENT DOCUMENTS 4,969,105 A 11/1990 Gaenssle
5,105,519 A * 4/1992 Doniwa ................ B25B 23/147 173/1
(Continued)

FOREIGN PATENT DOCUMENTS

EP 0291215 A2 11/1988
EP 0340999 A1 11/1989
(Continued)

OTHER PUBLICATIONS

European Office Action dated Oct. 28, 2021, issued in European Application No. 19715466.9.
(Continued)

*Primary Examiner* — Tom Rodgers
(74) *Attorney, Agent, or Firm* — Holtz, Holtz & Volek PC

(57) ABSTRACT

A hand held electric pulse tool performs tightening operations in which torque is delivered in pulses to tighten a screw joint. The tool includes an output shaft and a sensor to determine a parameter value associated with tightening of the screw joint. The tool is operative to provide torque pulses on the output shaft in a tightening direction until a first parameter value associated with the tightening of the screw joint is reached, then pause the tightening during a first time interval, and then provide torque pulses on the output shaft in a loosening direction until a second parameter value is reached. Next the electrical pulse tool is operative to pause the tightening during a second time interval and provide
(Continued)

torque pulses on the output shaft in the tightening direction until a third parameter value is reached.

11 Claims, 3 Drawing Sheets

(58) Field of Classification Search
USPC .................................... 81/469; 173/176, 179
See application file for complete search history.

(56) References Cited

U.S. PATENT DOCUMENTS

| | | | | |
|---|---|---|---|---|
| 5,571,971 | A * | 11/1996 | Chastel | B25B 23/14<br>73/761 |
| 2005/0205274 | A1 * | 9/2005 | Bogue | B25B 21/00<br>173/176 |
| 2014/0158390 | A1 | 6/2014 | Mashiko et al. | |
| 2017/0173768 | A1 * | 6/2017 | Dey, IV | B25B 23/1475 |
| 2018/0290275 | A1 | 10/2018 | Asplund | |
| 2019/0275650 | A1 | 9/2019 | Friberg et al. | |
| 2020/0055169 | A1 | 2/2020 | Klotblixt | |

FOREIGN PATENT DOCUMENTS

| | | | |
|---|---|---|---|
| EP | 1084010 | A1 | 3/2001 |
| WO | 2011013853 | A2 | 2/2011 |
| WO | 2017063851 | A1 | 4/2017 |
| WO | 2017207549 | A1 | 12/2017 |

OTHER PUBLICATIONS

International Preliminary Report on Patentability (IPRP) dated Mar. 12, 2020 issued in International Application No. PCT/EP2019/058271.
International Search Report (ISR) dated Jul. 2, 2019 issued in International Application No. PCT/EP2019/058271.
Written Opinion dated Jul. 2, 2019 issued in International Application No. PCT/EP2019/058271.

* cited by examiner

HAND HELD ELECTRIC PULSE TOOL AND A METHOD FOR TIGHTENING OPERATIONS

FIELD

The disclosure relates to a hand held electric pulse tool and a method in a hand held electric pulse tool for performing tightening operations in which torque is delivered in pulses to tighten and/or loosen screw joints.

BACKGROUND

During a tightening operation, in which a hand held electric pulse tool is used for tightening a joint, torque is applied to the joint in pulses by a motor housed inside the hand held electric pulse tool. Often it is desired to control the tightening such that a specific torque or clamp force is installed into the joint. The applied torque may be monitored by a torque sensor, but it may also be monitored by an angle meter, an accelerometer or a gyro that monitors the retardation of the output shaft so as to indirectly monitor the applied torque.

It is often important to achieve high productivity and accuracy when using hand held electric pulse tools. For instance, when the hand held electric pulse tool is used in production it is important to shorten the time used to produce each unit. Therefore the hand held electric pulse tool is often adapted to tighten screw joints as quickly and accurately as possible.

One solution to increase accuracy is to reduce the power of torque pulses towards the end of the tightening.

For hand held power tools it is important both that the reaction force that the operator is subjected to is as low as possible and that the accuracy of the concluded tightening is as high as possible.

An accurate tightening typically implies that the clamp force installed into the joint is as accurate as possible. The clamp force in the joint is, however, typically not measured. Instead, the torque is measured, which gives an indication of how much clamp force has been installed into the joint. However, the torque sometimes gives an incorrect measure of how much clamp force has been installed into the joint, because friction may vary between different joints.

Hence, there is a need for a hand held electric pulse tool that is adapted to deliver torque pulses in which the installed torque may be controlled and in which a tightening operation is performed with as high accuracy as possible.

SUMMARY OF THE DISCLOSURE

An object of the present disclosure is to provide a hand held electric pulse tool that can reduce scatter in clamp force installed into joints. This object can be achieved by a hand held electric pulse tool that tightens and loosens the joint back and forth several times. By tightening and loosening the joint back and forth several times the joint will be mechanically normalized. Individual differences in surface structure will be worn down, and the population of joints will be more similar. This will result in a lower difference in clamp force between different joints.

Since the hand held electric pulse tool delivers torque in pulses, changing between tightening and loosening is possible without affecting the ergonomics of the hand held electric pulse tool.

The ergonomics would be severely affected if the hand held tool tightened and loosened the bolt by continuously turning the bolt, because this would result in a changing reaction force when the tool changed from tightening to loosening and vice versa.

This object is achieved in accordance with a first aspect of the disclosure by a hand held electric pulse tool for performing tightening operations in which torque is delivered in pulses to tighten a screw joint. The hand held electric pulse tool includes an output shaft and a sensor arranged to determine a parameter value associated with the tightening of the screw joint. The hand held electric pulse tool is operative to provide several torque pulses on the output shaft in a tightening direction until a first parameter value associated with the tightening of the screw joint is reached, then pauses the tightening during a first time interval, then provides several torque pulses on the output shaft in a loosening direction until a second parameter value associated with the tightening of the screw joint is reached, then pauses the tightening during a second time interval, and then provides several torque pulses on the output shaft in a tightening direction until a third parameter value associated with the tightening of the screw joint is reached.

A second aspect the disclosure relates to a method in a hand held electric pulse tool for performing tightening operations in which torque is delivered in pulses to tighten a screw joint, The hand held electric pulse tool includes an output shaft and a sensor arranged to determine a parameter value associated with the tightening of the screw joint. The method includes providing several torque pulses on the output shaft in a tightening direction until a first parameter value associated with the tightening of the screw joint is reached, then pausing the tightening during a first time interval, then providing several torque pulses on the output shaft in a loosening direction until a second parameter value associated with the tightening of the screw joint is reached, then pausing the tightening during a second time interval, and then providing several torque pulses on the output shaft in a tightening direction until a third parameter value associated with the tightening of the screw joint is reached.

BRIEF DESCRIPTION OF THE DRAWINGS

Further objects, features, and advantages of the present disclosure will appear from the following detailed description, wherein some aspects of the disclosure will be described in more detail with reference to the accompanying drawings, in which.

DETAILED DESCRIPTION

Figure 1:
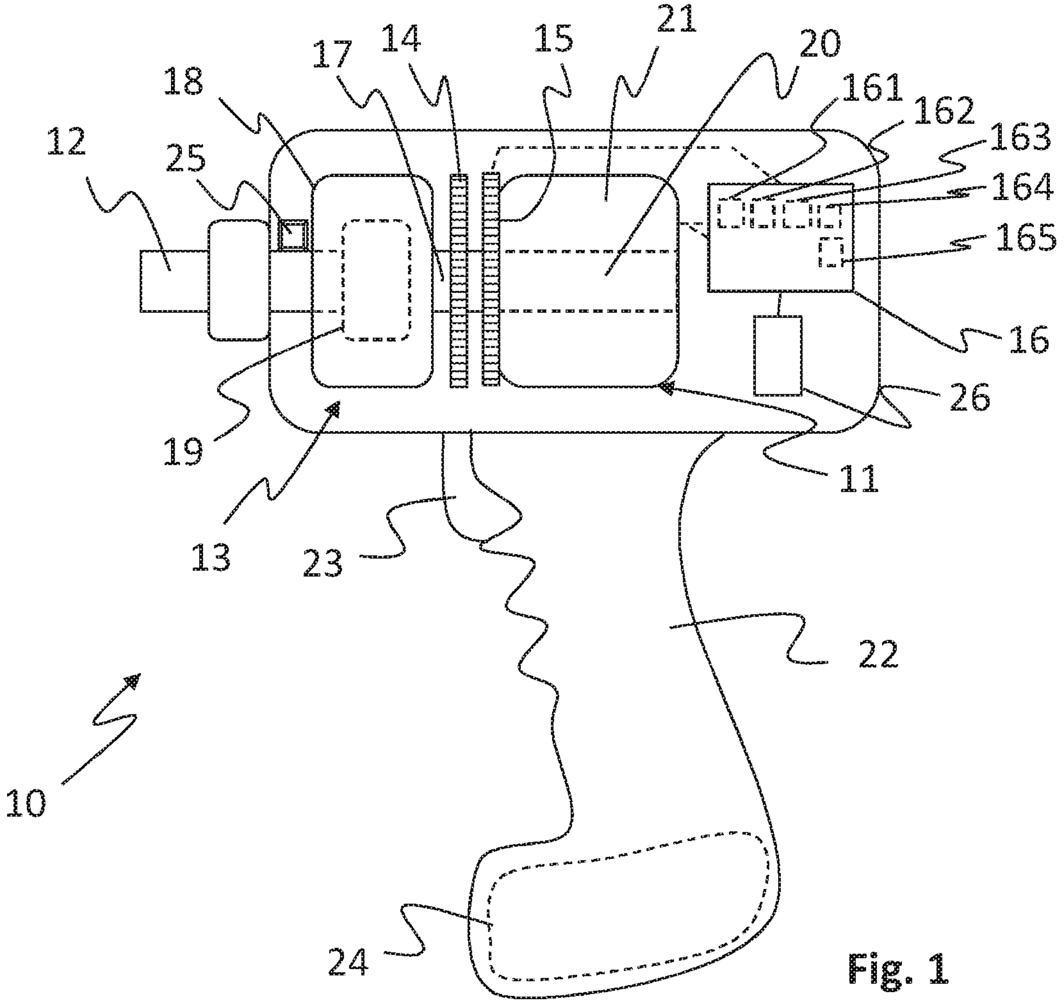
FIG. 1 is a schematic representation of a hand held electric pulse tool according to an exemplary embodiment of the disclosure.

Aspects of the present disclosure will be described more fully hereinafter with reference to the accompanying drawings. The device, method and computer program disclosed herein can, however, be realized in many different forms and should not be considered as being limited to the aspects set forth herein. Like numbers in the drawings refer to like elements throughout.

The terminology used herein is for the purpose of describing particular aspects of the disclosure only, and is not intended to limit the disclosure. As used herein, the singular forms “a”, “an” and “the” are intended to include the plural forms as well, unless the context clearly indicates otherwise.

In FIG. 1 a hand held electric pulse tool 10 in accordance with a specific embodiment of the disclosure is schematically shown. The hand held electric pulse tool 10 is configured to perform tightening operations in which torque is delivered in pulses to tighten screw joints. For this purpose, the hand held electric pulse tool 10 comprises a bidirectional electric motor 11 which is arranged to deliver torque in two opposite rotational directions, i.e. clockwise and counter clockwise.

The hand held electric pulse tool 10 further comprises a handle 22, which is of a pistol type in the shown embodiment. The disclosure is however intended to cover any type of hand held pulse tools. The disclosure is not limited to hand held electric pulse tools, but can also be implemented in other types of electric pulse tools. A power supply 24, such as a battery, is arranged in the lower part of the handle and a trigger 23 is arranged for manipulation by the operator so as to power the motor 11. The power supply may also be a connection to an electric cable.

Further, the hand held electric pulse tool comprises an output shaft 12 and a sensor 14, 15, 25 arranged to determine a parameter value associated with the tightening of the screw joint. The sensor may be a torque sensor, an angle sensor, an accelerometer, a gyro, or the like.

In the shown embodiment there is a first sensor 14, 15 that consists of an angle sensor that monitors the rotation of an input shaft 17 by means of a rotational sensor part 14 and a static sensor part 15. A second sensor 25 in the form of a torque sensor is arranged on the output shaft 12. For the disclosure either an angle sensor or a torque sensor is needed, not both. However, both sensors may be provided to offer increased accuracy or redundancy.

The shown embodiment further comprises a pulse unit 13 comprising an inertia body 18 that houses a piston activated rotator 19. The inertia body 18 is rigidly connected to the input shaft 17 and driven by a rotor 20 of the motor 11. The rotor 20 is in the shown embodiment arranged coaxially inside a stator 21 of the motor 11. A pulse is generated as cam surfaces (not shown) on the inside of the inertia body 18 interact with pistons so as to force the rotator 19 to rotate in a conventional manner well known in the art.

The disclosure is however not limited to pulse tools with a pulse unit. Pulses may also be produced in pulse tools with a direct connection between the motor and the output shaft by pulsing the output of the motor of the pulse tool. The disclosure also covers such pulse tools and striking pulse tools often known as impact wrenches.

For a pulse tool including a pulse unit, the sensor 14, 15, 25 arranged to determine a parameter value associated with the tightening of the screw may be arranged to monitor both the rotation of the inertia body 18 and the retardation of the inertia body 18. The retardation may be used to calculate the torque that is installed into the joint. In case the sensor 14, 15, 25 arranged to determine the parameter value associated with the tightening of the screw joint is a torque sensor 25, the sensor 25 can measure the torque directly. The torque senor 25 is then arranged on the output shaft 12 as close as possible to the joint in order to monitor the delivered torque.

An object of the present disclosure is to provide a hand held electric pulse tool 10 that can reduce scatter in clamp force installed into the joint. This object is achieved by tightening and loosening the joint back and forth several times. By tightening and loosening the joint back and forth several times the joint will be mechanically normalized. Individual differences in surface structure will be worn down, and the population of joints will be more similar. This will result in a lower difference in clamp force between different joints.

Another advantage with the inventive method according to the present disclosure is that the joint will also gain some relaxation effect due to the operation. Relaxation effect will also result in less change in clamp force over time for the joint.

Due to reaction force in the handle this method is not suitable with continuous tightening hand held tools, because it is not feasible to manage a tightening tool where a high reaction force in the handle change directions during the tightening process.

With the hand held electric pulse tool according to the present disclosure the reaction force is negligible. Thus a change of tightening direction is possible, without ergonomic issues or other general discomforts for the operator.

Thus, this object is achieved according to an exemplary embodiment of the disclosure by the hand held electric pulse tool being operative to provide several torque pulses on the output shaft in a tightening direction until a first parameter value associated with the tightening of the screw joint is reached, then to pause the tightening during a first time interval, then to provide several torque pulses on the output shaft in a loosening direction until a second parameter value associated with the tightening of the screw joint is reached, then to pause the tightening during a second time interval, and then to provide several torque pulses on the output shaft in a tightening direction until a third parameter value associated with the tightening of the screw joint is reached.

The hand held electric pulse tool being “operative to” do certain things means that the hand held electric pulse tool automatically provides the tightening and loosening pulses according to the different embodiments when the trigger is actuated.

In an exemplary embodiment of the present disclosure, the hand held electric pulse tool 10 is further operative to determine required pulses in the loosening direction sufficient to condition the joint. According to another exemplary embodiment of the present disclosure, the sensor is a torque sensor and the first—and second parameter values associated with the tightening of the screw joint are torque values. In yet another exemplary embodiment of the present disclosure, the sensor is an angle meter and the first—and second parameter values associated with the tightening of the screw joint are angle values. In yet another exemplary embodiment of the present disclosure, the hand held electric pulse tool is further adapted to reduce the power of the torque pulses in the loosening direction. In one exemplary embodiment, the first parameter value, the second parameter value and the third parameter value can be individually specified through for instance torque, angle or number of pulses. The first time interval and the second time interval can also be individually specified. In one exemplary embodiment, the first time interval and the second time interval can be set to zero. The individual settings for the first parameter value, the second parameter value, the third parameter value, the first time interval and the second time interval can be individually monitored and controlled.

According to one exemplary embodiment, the first parameter value, the second parameter value, the third parameter value, the first time interval and the second time interval can be individually monitored and controlled through torque build up and/or decrease, angle build up and/or decrease, and/or number of pulses in the tightening direction and/or loosening direction.

An advantage with the hand held electric pulse tool 10 according to the present disclosure is thus that the hand held electric pulse tool 10 can provide tightening with low variation in installed clamp force. The majority of the tightening operations will have the same clamp force. A quality increase is thus achieved, with respect to the clamp force installed into different joints.

Referring back to FIG. 1, the hand held electric pulse tool 10 further comprises a processor 16 arranged to control the motor 11. The hand held electric pulse tool 10 also comprises a memory 26 containing instructions executable by the processor 16. The processor 16 is a Central Processing Unit (CPU), microcontroller, Digital Signal Processor (DSP), or any other suitable type of processor capable of executing computer program code. The memory 26 is a Random Access Memory (RAM), a Read Only Memory (ROM), or a persistent storage, e.g. a single or combination of magnetic memory, optical memory, or solid state memory or even remotely mounted memory.

According to one aspect, the disclosure further relates to the above mentioned computer program, comprising computer readable code which, when run on the hand held electric pulse tool 10, causes the hand held electric pulse tool 10 to perform any of the aspects of the disclosure described herein.

When the above-mentioned computer program code is run in the processor 16 of the hand held electric pulse tool 10, it causes the hand held electric pulse tool 10 to be operative to provide several torque pulses on the output shaft in a tightening direction until a first parameter value associated with the tightening of the screw joint is reached. Further it causes the hand held electric pulse tool 10 to pause the tightening during a first time interval. Then it causes the hand held electric pulse tool 10 to provide several torque pulses on the output shaft in a loosening direction until a second parameter value associated with the tightening of the screw joint is reached. Next it causes the hand held electric pulse tool to pause the tightening during a second time interval. And then it causes the hand held electric pulse tool 10 to provide several torque pulses on the output shaft in a tightening direction until a third parameter value associated with the tightening of the screw joint is reached.

According to one aspect of the disclosure the processor 16 comprises one or several of:

- a first providing module 161 adapted to provide several torque pulses on the output shaft in the tightening direction until the first parameter value associated with the tightening of the screw joint is reached;
- a pausing module 162 adapted to pause the tightening during the first time interval;
- a second providing module 163 adapted to provide several torque pulses on the output shaft in the loosening direction until the second parameter value associated with the tightening of the screw joint is reached;
- a second pausing module 164 adapted to pause the tightening during a second time interval; and
- a third providing module 165 adapted to provide several torque pulses on the output shaft in the tightening direction until the third parameter value associated with the tightening of the screw joint is reached.

The first providing module 161, the pausing module 162, the second providing module 163, the second pausing module 164 and the third providing module 165 are implemented in hardware or in software or in a combination thereof. The modules 161, 162, 163, 164 and 165 are, according to one aspect, implemented as a computer program stored in the memory 26 which is run on the processor 16. The hand held electric power tool 10 is further configured to implement all the aspects of the disclosure as described herein.

Figure 2:
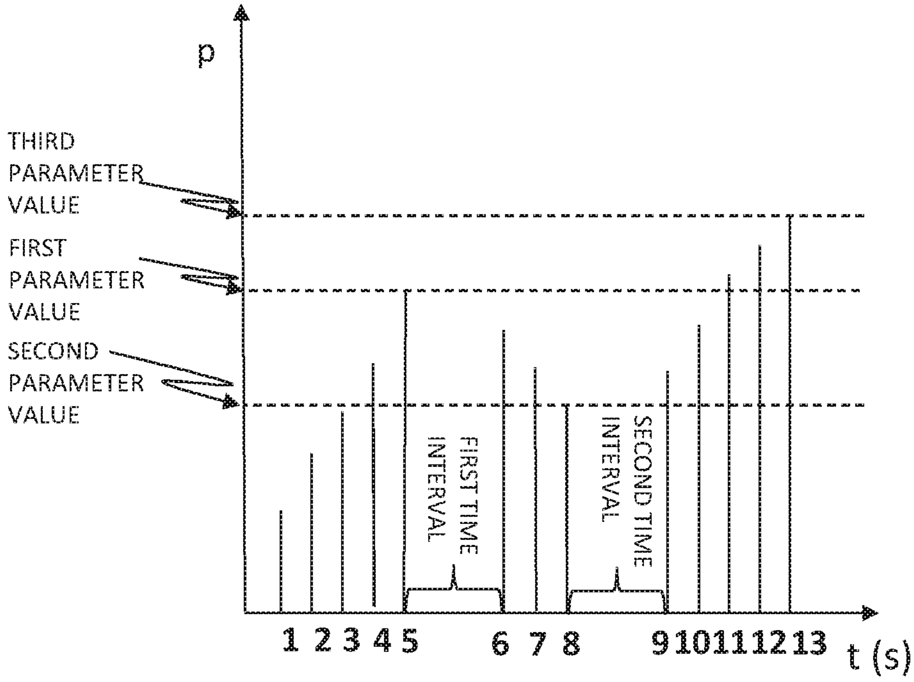
FIG. 2 is a schematic representation of the delivered torque pulses as a function of operation time in an example of a tightening performed by the hand held electric pulse tool.

One example of a tightening performed by the hand held electric pulse tool 10 according to an exemplary embodiment is illustrated in FIG. 2. In FIG. 2 the determined parameter p associated with the tightening of the screw joint is illustrated as a function of time t. In this example the tightening operation is illustrated as comprising 13 torque pulses 1-13. The tightening operation can however require fewer or more torque pulses. Each torque pulse in the tightening direction will add torque and thus increase the parameter p associated with the tightening of the screw joint. And each torque pulse in the loosening direction will reduce the parameter p associated with the tightening of the screw joint. As can be seen in FIG. 2, the hand held electric pulse tool 10 provides torque pulses 1 to 5 on the output shaft 12 in the tightening direction until the first parameter value associated with the tightening of the screw joint is reached. Next the hand held electric pulse tool 10 pauses the tightening during the first time interval. Thereafter the hand held electric pulse tool 10 provides torque pulses 6 to 8 on the output shaft 12 in the loosening direction until the second parameter value associated with the tightening of the screw joint is reached. Next the hand held electric pulse tool 10 pauses the tightening during the second time interval. Thereafter the hand held electric pulse tool 10 provides torque pulses 9 to 13 on the output shaft 12 in the tightening direction until the third parameter value associated with the tightening of the screw joint is reached.

In the tightening illustrated in FIG. 2 the hand held electric pulse tool 10 thus first provides torque pulses in the tightening direction, then provides torque pulses in the loosening direction, and finally again provides torque pulses in the tightening direction.

Thus the joint will be mechanically normalized. Individual differences in surface structure will be worn down, and the population of joints will be more similar. This will result in a lower difference in clamp force between different joints.

There are however other exemplary embodiments of the hand held electric pulse tool 10 where the first and second time intervals can be set to zero, which provides a tightening operation without pauses between the direction changes.

According to one exemplary embodiment of the hand held electric pulse tool 10, the sensor 14, 15, 25 is a torque sensor 25 and the parameter value associated with the tightening of the screw joint is a torque value. In this exemplary embodiment FIG. 2 illustrates torque on the y-axis.

In another exemplary embodiment of the hand held electric pulse tool 10, the sensor 14, 15, 25 is an angle meter and the parameter value associated with the tightening of the screw joint is an angle value. In this exemplary embodiment FIG. 2 illustrates angle on the y-axis.

In yet another exemplary embodiment of the hand held electric pulse tool 10, the hand held electric pulse tool 10 is further adapted to reduce the power of the torque pulses in the loosening direction.

As illustrated in FIG. 2, the first parameter value can be below the third parameter value. In these exemplary embodiments the hand held electric pulse tool 10 can provide tightening in which the third parameter value is reached at a later stage in the tightening process.

Figure 3:
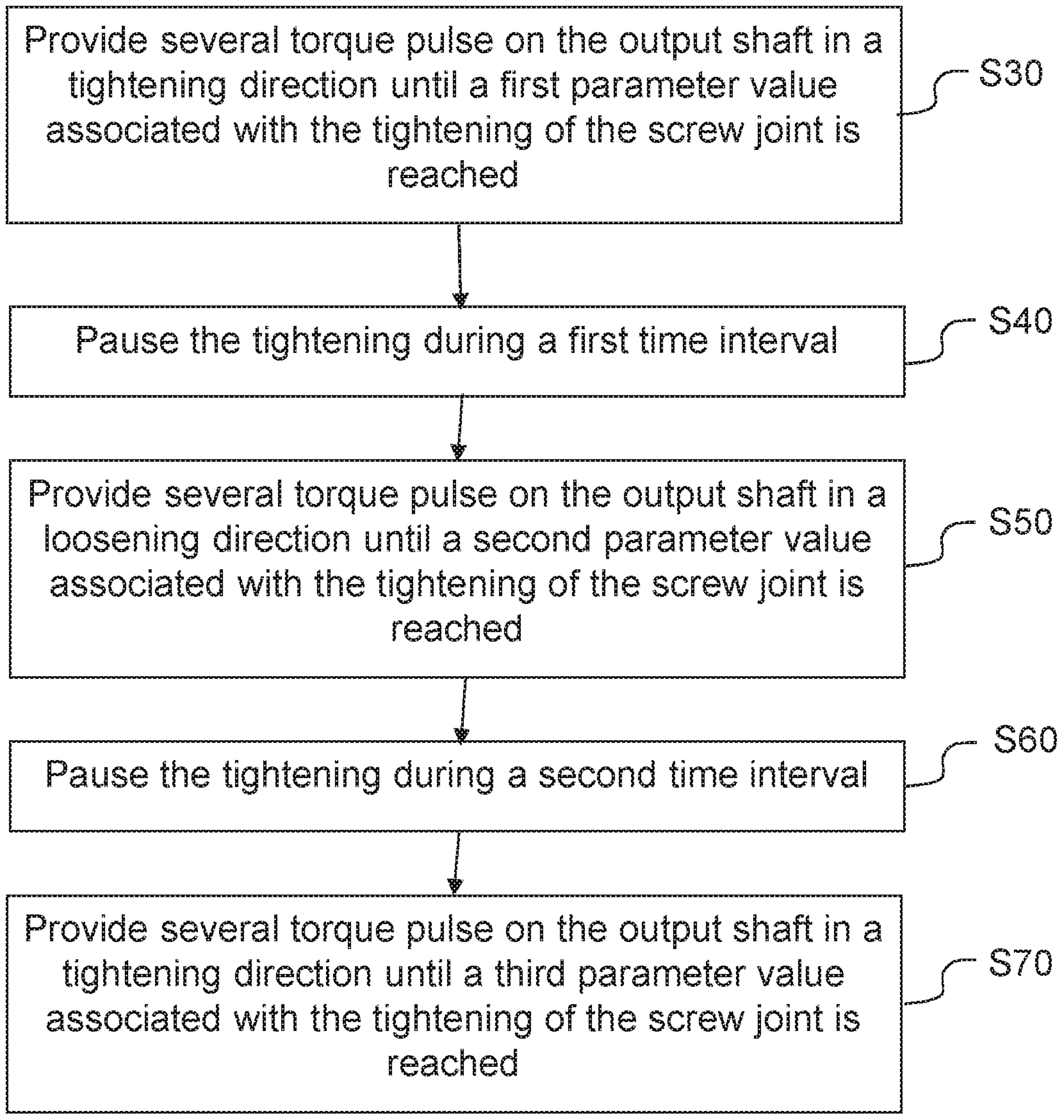
FIG. 3 is a flow chart illustrating exemplary embodiments of the methods performed in the hand held electric pulse tool.

FIG. 3 illustrates the steps in a method, performed in the hand held electric pulse tool 10 for performing tightening operations according to the above-described exemplary embodiments. As in the above-described exemplary embodiments, torque is delivered in pulses to tighten a screw joint. Also as described above, the hand held electric pulse tool 10 comprises an output shaft 12, and a sensor 14, 15, 25 arranged to determine a parameter value associated with the tightening of the screw joint.

In a first step S30 the hand held electric pulse tool 10 provides torque pulses on the output shaft 12 in a tightening direction until a first parameter value associated with the tightening of the screw joint is reached. In a next step S40 the hand held electric pulse tool 10 pauses the tightening during a first time interval. Thereafter in a next step S50 the hand held electric pulse tool 10 provides several torque pulses on the output shaft in a loosening direction until a second parameter value associated with the tightening of the screw joint is reached. In a next step S60 the hand held electric pulse tool 10 pauses the tightening during a second time interval. Thereafter in a next step S70 the hand held electric pulse tool 10 provides several torque pulses on the output shaft in a loosening direction until a third parameter value associated with the tightening of the screw joint is reached.

According to one exemplary embodiment of the method, the method further comprises determining required pulses in the loosening direction sufficient to condition the joint.

In another exemplary embodiment of the method, the sensor is a torque sensor and the first—and second parameter values associated with the tightening of the screw joint are torque values.

According to another exemplary embodiment of the method, the sensor is an angle meter and the first—and second parameter values associated with the tightening of the screw joint are angle values.

In a yet another exemplary embodiment of the method, the method further comprises reducing the power of the torque pulses in the loosening direction.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The invention claimed is:

1. A hand held electric pulse tool for performing tightening operations in which torque is delivered in pulses to tighten a screw joint, the hand held electric pulse tool comprising:

an output shaft;

a sensor configured to determine a parameter value associated with tightening of the screw joint; and a processor configured to control the hand held electric pulse tool to:

provide a plurality of torque pulses on the output shaft in a tightening direction until the parameter determined by the sensor reaches a first value;

pause the tightening during a first time interval;

provide a plurality of torque pulses on the output shaft in a loosening direction until the parameter determined by the sensor reaches a second value, the second value being lower than the first value;

pause the tightening during a second time interval; and provide a plurality of torque pulses on the output shaft in the tightening direction until the parameter determined by the sensor reaches a third value, the third value being higher than the second value, wherein the processor is configured to provide the torque pulses in the tightening direction and the loosening direction to tighten and loosen the screw joint back and forth several times.

2. The hand held electric pulse tool according to claim 1, wherein the processor is configured to determine required pulses in the loosening direction sufficient to condition the screw joint.

3. The hand held electric pulse tool according to claim 1, wherein the sensor is a torque sensor and the first and second values are torque values.

4. The hand held electric pulse tool according to claim 1, wherein the sensor is an angle meter and the first and second values are angle values.

5. The hand held electric pulse tool according to claim 1, wherein the processor is configured to control the hand held electric pulse tool to reduce power of the torque pulses in the loosening direction.

6. A method for a hand held electric pulse tool for performing tightening operations in which torque is delivered in pulses to tighten a screw joint, the hand held electric pulse tool comprising an output shaft and a sensor configured to determine a parameter value associated with tightening of the screw joint, the method comprising:

providing a plurality of torque pulses on the output shaft in a tightening direction until the parameter determined by the sensor reaches a first value;

pausing the tightening during a first time interval;

providing a plurality of torque pulses on the output shaft in a loosening direction until the parameter determined by the sensor reaches a second value, the second value being lower than the first value;

pausing the tightening during a second time interval; and providing a plurality of torque pulses on the output shaft in the tightening direction until the parameter determined by the sensor reaches a third value, the third value being higher than the second value, wherein the torque pulses are provided in the tightening direction and the loosening direction to tighten and loosen the screw joint back and forth several times.

7. The method according to claim 6, wherein further comprising determining required pulses in the loosening direction sufficient to condition the screw joint.

8. The method according to claim 6, wherein the sensor is a torque sensor and the first and second values are torque values.

9. The method according to claim 6, wherein the sensor is an angle meter and the first and second values are angle values.

10. The method according to claim 6, further comprising reducing power of the torque pulses in the loosening direction.

11. A non-transitory computer-readable storage medium having stored thereon a computer program which is executable by a computer in an electric pulse tool, the hand held electric pulse tool comprising an output shaft and a sensor configured to determine a parameter value associated with tightening of the screw joint, to control the electric pulse tool to perform operations comprising:

providing a plurality of torque pulses on the output shaft in a tightening direction until the parameter determined by the sensor reaches a first value;

pausing the tightening during a first time interval;

providing a plurality of torque pulses on the output shaft in a loosening direction until the parameter determined by the sensor reaches a second value, the second value being lower than the first value;

pausing the tightening during a second time interval; and providing a plurality of torque pulses on the output shaft in the tightening direction until the parameter determined by the sensor reaches a third value, the third value being higher than the second value, wherein the torque pulses are provided in the tightening direction and the loosening direction to tighten and loosen the screw joint back and forth several times.

* * * * *